Jan. 9, 1940.   W. W. COWGILL   2,186,282
APPARATUS FOR TREATING MATERIAL
Filed Nov. 27, 1936   5 Sheets-Sheet 1
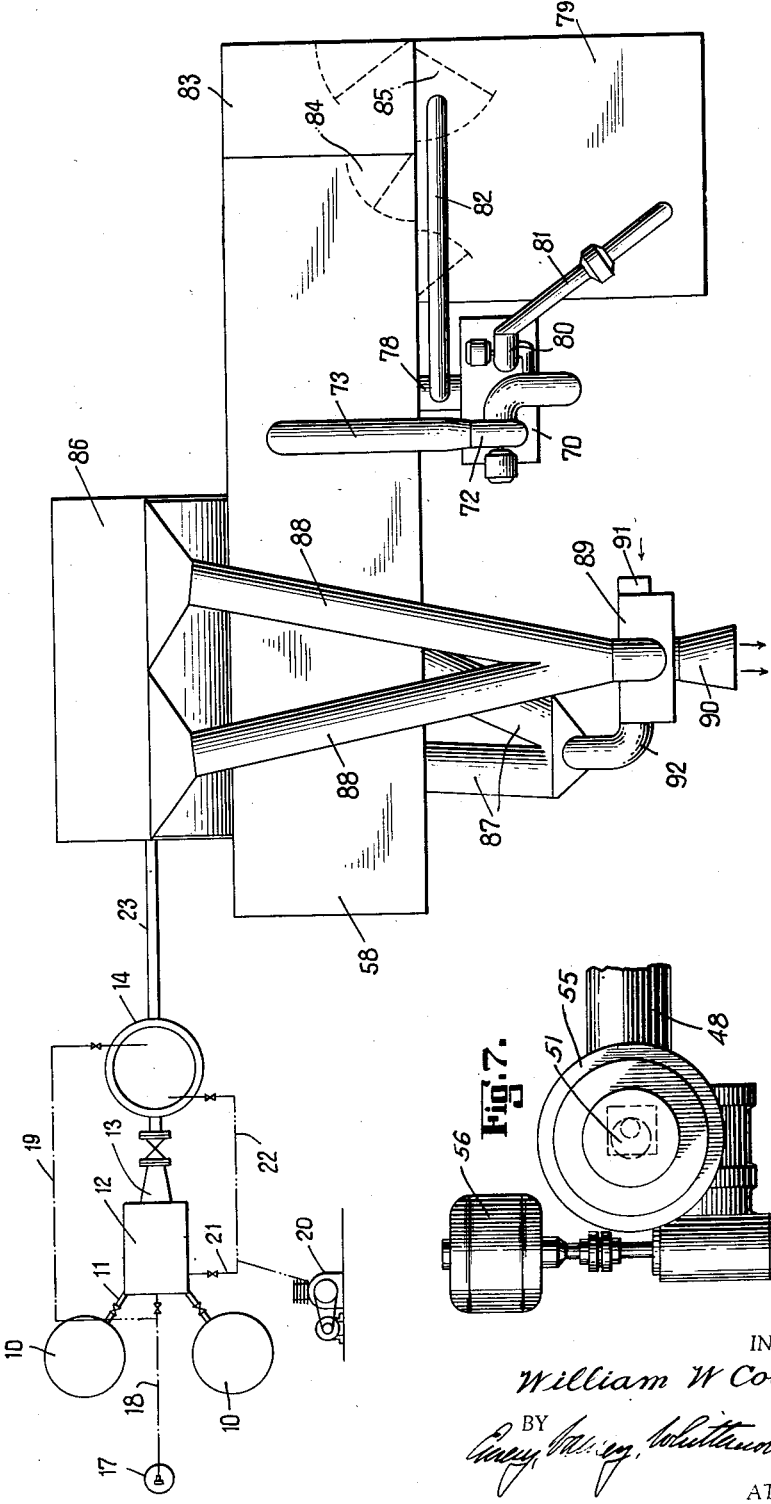
INVENTOR.
William W Cowgill
BY
ATTORNEY.

Jan. 9, 1940.                    W. W. COWGILL                    2,186,282
                        APPARATUS FOR TREATING MATERIAL
                        Filed Nov. 27, 1936        5 Sheets-Sheet 2
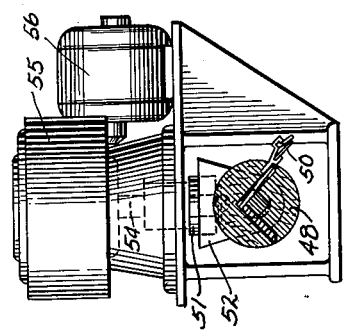
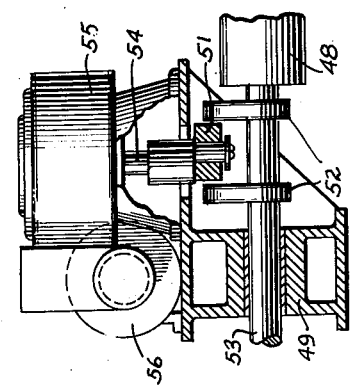
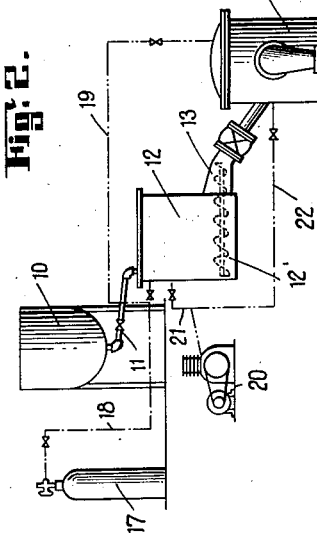
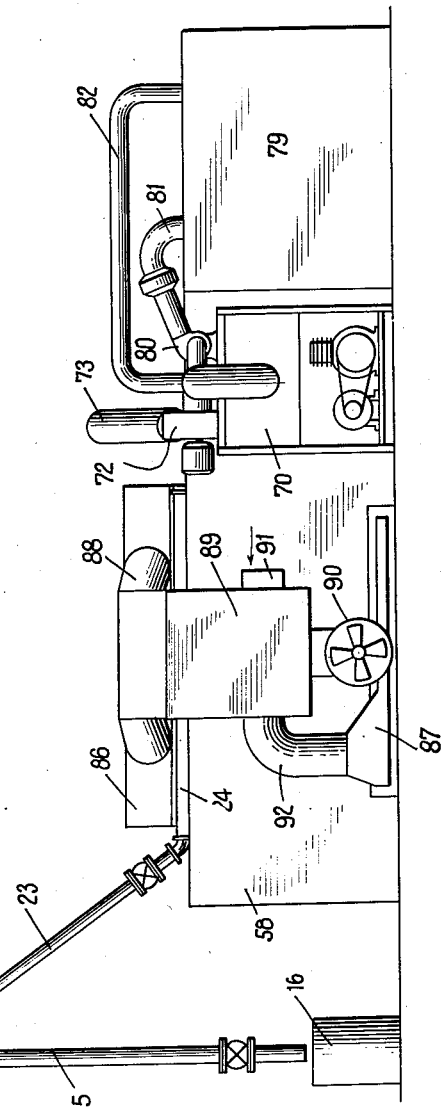
INVENTOR.
William W Cowgill
BY
ATTORNEYS

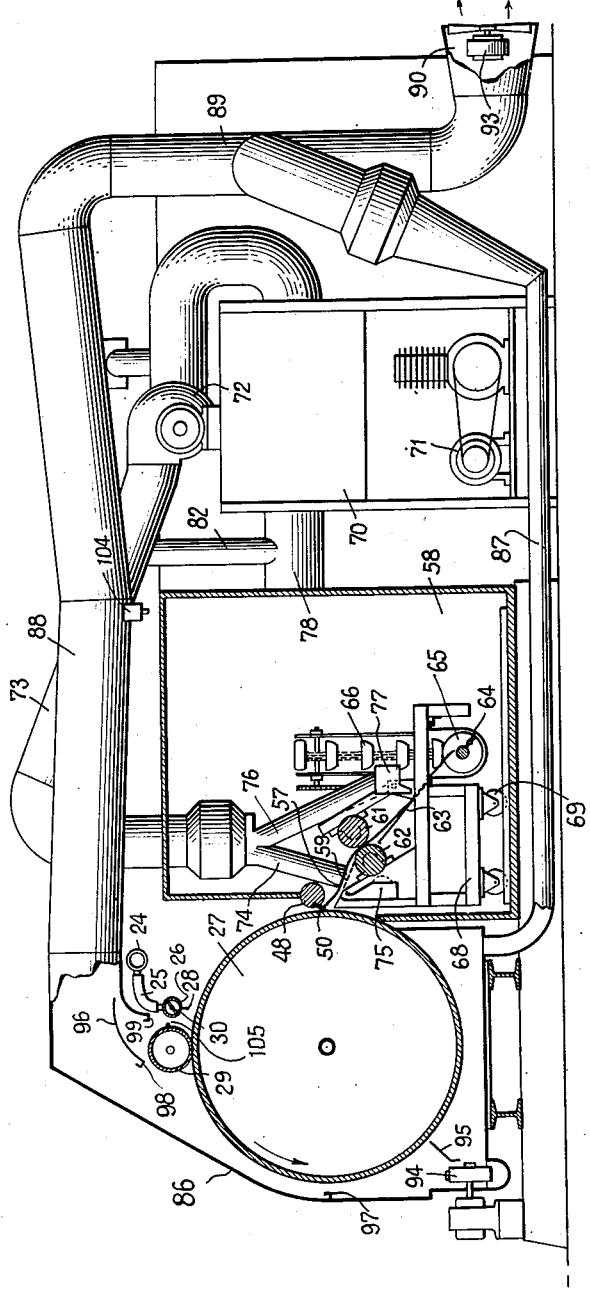

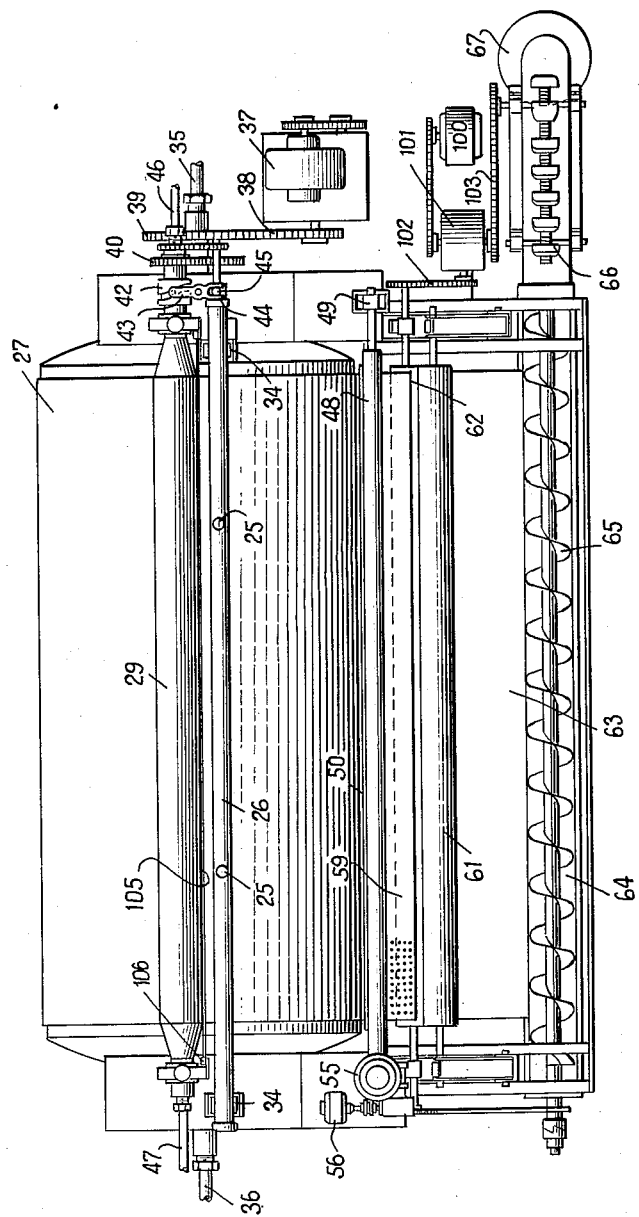

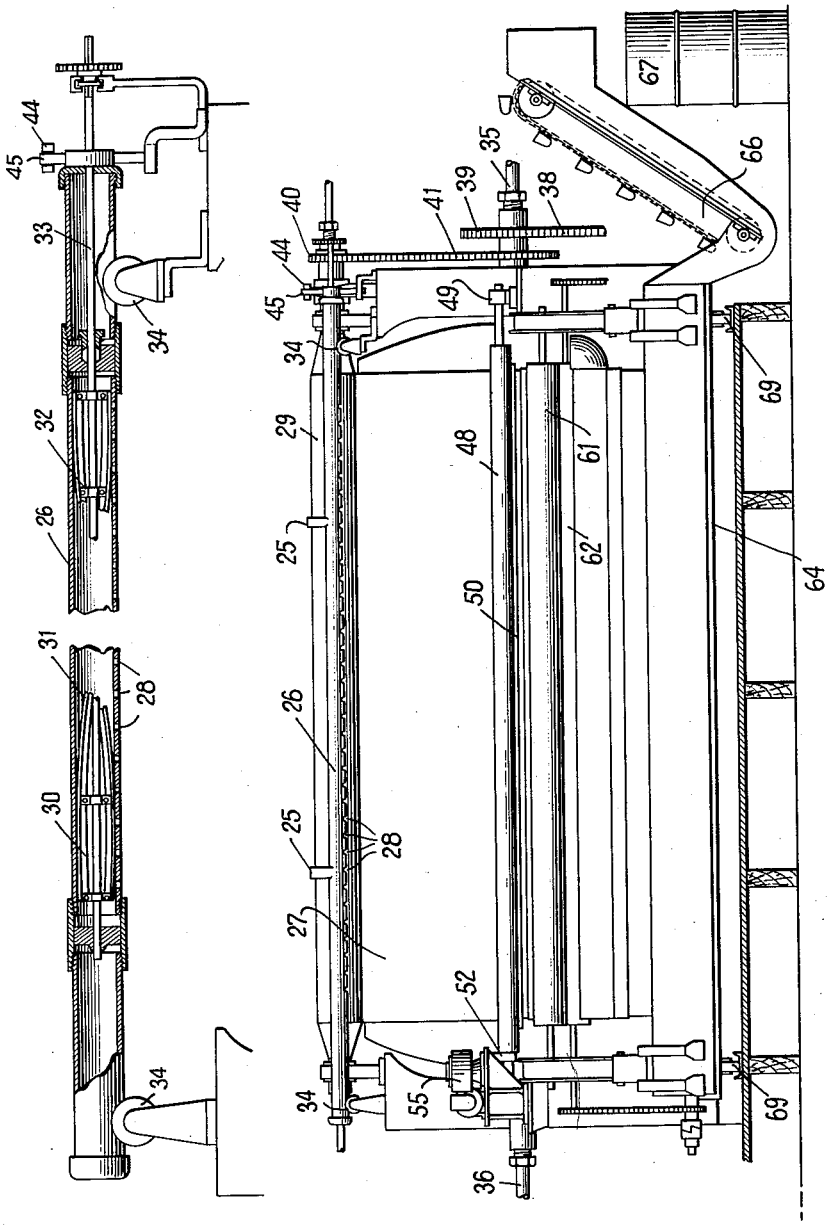

Patented Jan. 9, 1940

2,186,282

UNITED STATES PATENT OFFICE 2,186,282

APPARATUS FOR TREATING MATERIAL

William W. Cowgill, Fairfield, Conn., assignor to Sardik Incorporated, Jersey City, N. J., a corporation of Delaware Application November 27, 1936, Serial No. 112,901

15 Claims. (Cl. 159—12)

This invention relates to an apparatus for treating material to reduce the moisture content thereof. Although it is especially adapted to treating food materials such as fruits and vegetables to render them resistant to ordinary deteriorating influences, it will be apparent that the various features of novelty incorporated herein are not limited in their use to the treatment of any one class of materials.

An object of this invention is to provide a unitary apparatus for preparing suitable materials for the drying operation, drying the material, and collecting the dried material substantially without injuring the delicate components of the original material such, for example, as the esters, vitamins and the like in the case of fresh fruits and vegetables.

This and other objects are accomplished by the present invention, one embodiment of which is illustrated in the accompanying drawings in which, Fig. 1 is a partly diagrammatic plan view showing a food drying apparatus constructed in accordance with one embodiment of this invention;

Fig. 2 is a similar view in elevation of the apparatus shown in Fig. 1;

Fig. 3 is a transverse sectional view through the drying mechanism and associated parts;

Fig. 4 is a plan view of the drying drum and certain associated parts;

Fig. 5 is a view in elevation of the mechanism shown in Fig. 4;

Fig. 6 is a view partly in section of the distributor head for distributing material to be dried on the drying drum;

Figs. 7, 8 and 9 are detail views, partly in section, of the mechanism for reciprocating the scraper or knife blade employed in removing material from the drying drum.

For the purposes of description, the drawings show an apparatus for first preparing fruit and vegetable materials for drying, then drying the material, and finally collecting the dried material.

In order to prepare a suitable pulp from such materials as apples and the like, which are too hard to be satisfactorily pulped without a preliminary softening, I provide one or more cookers 10 in which such materials are cooked only enough to soften them sufficiently to permit the formation of a suitable pulp by conventional pulping mechanism. Each cooker may be of any desired form such, for example, as a steam jacketed kettle which is preferably steam jacketed only in part in order to prevent deterioration of the product on the sides of the kettle at the surface of the material. The bottom of each kettle is connected by a valve-controlled connecting line 11 with a reservoir 12 to which the softened material is delivered for holding until such time as it is fed by a feed worm 12' through a valve-controlled connecting line 13 to a pulping mechanism 14 of conventional type, wherein the softened material is formed into a pulp suitable for drying by dividing the product into fine particles, each consisting, in the case of fruits and vegetables, of individual cells or of a small number of cells. The pulping mechanism separates out the waste parts such as the skins and the seeds of fruits from the pulp and this waste is discharged through a valve-controlled waste line 15 into cans 16 or the like.

A tank 17 of carbon dioxide or other inert gas is connected through valve-controlled lines 18 and 19 with the container or hopper 12 and pulper 14, respectively, so that they can be filled with an inert atmosphere and the fresh pulp separated from contact with the air and thus protected against oxidation.

If desired, a source of vacuum such, for example, as a vacuum pump 20, may also be connected through valve-controlled lines 21 and 22 with the hopper 12 and pulper 14, respectively, for the purpose of evacuating air therefrom prior to the delivery of inert gas thereto should such an operation seem advisable. Ordinarily, however, the vacuum apparatus is not required.

A valve-controlled feed line 23 connects the bottom of the pulper with a horizontal feed tube 24 connected at spaced intervals through flexible connections 25 with a longitudinally extending pulp distributor tube 26 located above and extending across the outer face of a rotary interiorly heated drying drum 27. The bottom of the pulp distributor tube 26 has perforations 28 through which the pulped material is fed to the drying surface.

Closely adjacent the distributor tube, a rotary interiorly heated distributor roll 29 is positioned in close proximity to the drum 27, the space between the drum and the distributor roller being relatively small.

The pulp is distributed evenly throughout the length of the distributor tube 26 by an agitator or spreader of any desired type, such as that formed by flexible wipers 30 having resilient edges 31, for example of rubber, mounted on spider arms 32 secured to a rotary shaft 33 extending through the center of the distributor tube 26. The flexibility of the wipers 30 permits the supporting spider arms 32 to be secured to the rotary shaft 33 so as to flex the wipers into more or less of a spiral position, see Fig. 6, to assist in the distribution of the pulp lengthwise of the distributor tube 26, and the latter is mounted on rollers 34 for reciprocation to assist in depositing the pulp evenly across the face of the drying drum 27.

The flow of pulp through the perforations 28 of the distributor tube 26 can be controlled by the valve in the feed line 23, or by any suitable mechanism.

The material is deposited by the distributor tube over the top of the drum adjacent the distributor roller 29. It passes between this roller and the heated drum surface and the material is thereby dispersed over the drum surface in the manner described, for example, in Sartakoff patent, No. 1,908,489, May 9, 1933.

It will be apparent that other forms of apparatus can be employed for dispersing the material on the drying surface.

The drum 27 is of generally conventional form and is preferably made from stainless steel. It is heated interiorly by steam which is supplied thereto through a supply line 35 and returned to the boilers through a return line 36. Other forms of heated surfaces can also be used.

The drum and associated mechanism are driven from any suitable source of power such, for example, as motor 37 connected through reduction gearing 38 with a drum driving gear 39. The distributor roll 29 has a driving gear 40 driven from the drying drum shaft by reduction gearing 41 so that the peripheral speed of the distributor roll is substantially the same as that of the drum.

The reciprocation of the pulp distributor tube 26 is obtained by a cam 42 secured to the distributor roll shaft for oscillating a pivoted yoke 43, the opposite end of which comprises a fork 44 engaging a pin 45 secured to the distributor tube.

The distributor roll is heated interiorly by steam delivered thereto through a steam supply line 46 and returned to the boilers through a return line 47.

On the drum the material is subjected to a drying heat for a predetermined period depending upon the speed of rotation of the drum. The dried material is then removed by a scraper or knife mechanism comprising a blade holder 48 rotatably and slidably mounted in end bearings 49. A knife blade 50, preferably of steel, is mounted in the holder 48 and pressed thereby against the drying surface with sufficient pressure to remove all particles of the dried material therefrom. The knife mechanism is reciprocated slowly back and forth during operation of the drier by means of an eccentric 51 located between bearing plates 52 on one end of the shaft 53 supporting the blade holder 48. The eccentric 51 is mounted on the shaft 54 of a gear reducer 55 driven from any suitable source of power such as the motor 56.

The material is removed in the form of a film 57, see Fig. 3, and is immediately delivered to an adjacent cooling zone which may be of any desired construction. In the illustrated embodiment, the cooling zone is formed by an air conditioned operating chamber 58 through which air having a predetermined relative humidity and temperature is continually circulated, and in which the various operating controls for the apparatus are located so that a single operator can control the drying operation therefrom. Glass windows are provided in the wall of the operating chamber adjacent the drum so that the drying operation can be observed.

In this cooling zone, the residual heat is extracted from the film immediately upon its removal by the knife blade, by immediately subjecting the moving film to the cooling effect of a blast of suitably conditioned air. In the illustrated apparatus, the film is drawn over a perforated plate 59 by rotating upper and lower take-off rolls 61 and 62, respectively, and is thence directed downwardly over a guide plate 63 into a suitable collecting mechanism such as the collecting trough 64 and worm 65 which breaks up the film and delivers it to a bucket conveyer 66 which deposits the dried material in a container 67 or the like.

The film collecting and cooling mechanism is supported on a frame 68 mounted on rollers 69, see Fig. 3, so that the whole can be moved away from the drum for cleaning or other purposes.

The operating chamber 58 forms a part of the air conditioned cooling system for the film. An air conditioning mechanism 70 of any desired type, driven from any suitable source of power 71, is provided with a blower mechanism 72 connected to a duct 73 through which cool air is delivered to the operating chamber 58. An air duct 74 conveys cool air to an air box 75 from which the air is blown through the perforated plate 59 against the bottom face of the film 57 just after it leaves the knife blade 50. A second air duct 76 delivers cool air to an air box 77 which directs a blast of cool air against the top face of the film as it passes downwardly over the plate 63 to the collecting trough 64. Warm air is drawn through a return line 78 to the air conditioner unit 70.

Adjacent the operating chamber 58 and connected thereto is a packaging room 79, the atmosphere of which is similarly air conditioned by the same air conditioning unit 70. A blower 80 delivers cool air through the line 81 to the room 79 and warm air is withdrawn therefrom through an air duct 82 connecting with the return air duct 78. An air lock 83 having doors 84 and 85 connecting with the operating room 58 and the packaging room 79, respectively, is provided.

The air delivered to the operating chamber and the packaging room has a temperature of approximately 65° F. and a relative humidity of less than 40%.

Mechanism is provided for regulating and controlling the evaporation of moisture from the material while it is on the drying drum, so as to insure against overheating thereof during the drying period while subjecting it to the most effective drying temperature. That part of the drying surface on which the drying operation is conducted, that is to say, the drum surface between the distributor roll 29 and the scraper or knife 50 is enclosed in a hood 86 extending from a point adjacent the knife blade to a point above the distributor roll. Provision is made for directing a stream of moisture collecting air through the hood 86 along the drying surface in contact with the material being dried and in a direction counter to the direction of movement of the drum. It will be apparent that the temperature and relative humidity of the moisture collecting air stream can be so regulated as to increase the efficiency of the drying operation and so control the evaporation of moisture from the material as to assist in producing a satisfactory product. The air inlet duct or ducts 87 deliver the incoming air stream to the bottom of the hood 86 adjacent the substantially dry material as it approaches the knife blade 50. The air stream passes through the hood 86 along the surface of the drum in a direction counter to the direction of the drum movement and past the distributing roll 29 to an outlet duct or ducts 88 which deliver it to an economizer 89 through which it passes to a suitable outlet 90. An air inlet 91 directs incoming air through the economizer to an air pipe 92 connecting with the air inlet duct 87. The economizer is provided for the purpose of using the latent heat of the moisture carried by the outgoing air stream for raising the temperature of the incoming air stream and thus increasing the efficiency of the apparatus.

Any suitable type of blower mechanism such as that indicated by exhaust fans 93 can be employed for insuring the flow of the moisture collecting air stream through the system. In addition, a blower mechanism is provided by booster fans 94 located in the bottom of the hood 86 adjacent the drying drum for the purpose of forcing air upwardly through the hood 86 and to assist in the proper flow of air counter current to the movement of the drum. In this way any back flow of moisture laden air is prevented and possible contact of moisture with the substantially dry material on the lower side of the drum is prevented. A baffle 95 is located in the hood adjacent the booster fans 94 for directing the incoming air stream thereto, and a baffle 96 is located above the distributor roll 29 for directing the flow of the outgoing moisture laden air.

The top of the hood 86 is steeply inclined so that any moisture which may condense on the inner face thereof will not drip on the drying drum but will flow downwardly along the face of the hood to a gutter 97 by means of which it is carried to an outside point. Similar gutters 98 and 99 are formed on the baffle 96 and the inner ends of the air ducts 88, respectively, to collect any moisture condensing on such surfaces. The outlet air ducts are inclined and have condensate discharge outlets 104 at the bottoms of the inclines to permit removal of condensed moisture at that point.

The take-off rolls 61 and 62 are driven from any suitable source of power such as the motor 100 through a gear reduction box 101 and connecting gears 102. The bucket conveyer 66 is also driven through the same gear reduction box 101 by a chain connection 103.

Means is provided for preventing material from adhering to the distributor roll 29 and becoming cooked thereon. As illustrated, this means comprises a wire 105, see Figs. 3 and 4, which is mounted in holders 106 on the bearing blocks at each end of the roll and is held in contact with the surface of the distributor roll. Such material as is picked up by the roll in its rotation is prevented from adhering thereto by the wire 105 which scrapes against the roll surface as the latter rotates.

The operation of the apparatus will be apparent. Such material as requires softening in order to permit the formation of a pulp suitable for drying is first subjected to a cooking operation in one of the cookers 10, and the softened material then delivered to the housing or container 12 through the valve-controlled line 11. From the latter housing it is delivered through the valve-controlled line 13 by means of the worm 12' to the pulping mechanism 14 where it is made into a suitable pulp and where extraneous materials such as stems, seeds and the like are separated out and discharged through the waste line 15.

The material is separated from contact with the air by connecting the housing 12 and the pulper 14 with the tank 17 of carbon dioxide or other inert gas and the material thus protected against oxidation. When it is desired, the housing 12 and the pulper 14 can be evacuated prior to the delivery of inert gas thereto by first connecting such mechanisms with the vacuum pump 18 or the like through the valve-controlled lines 21 and 22, after which such lines are closed and the inert gas lines opened. Usually, the evacuating apparatus need not be employed.

From the pulper the material to be dried is carried through the line 23 to the feed tube 24 from which it flows through the flexible connections 25 to the hollow distributor tube 26 in which it is evenly spread by the rotating wipers 30. The distributor tube 26 reciprocates slowly above the drying drum 27 and the pulped material is deposited through the perforations 28 of the distributor tube on the upper surface of the drum which is rotating in the direction of the arrow in Fig. 3. The pulped material then passes on the drum surface beneath the distributor roll 29 by means of which it is distributed over the drum surface in the manner set forth in the above noted Sartakoff patent. While on the drum surface the material is dried and the vapor given off is collected by the stream of suitably conditioned air passing over the material within the hood in a direction counter to the direction of rotation of the drum. The dry material is removed by the blade 50 in the form of a substantially continuous film which is immediately delivered to the cooling zone provided by the air conditioned operating chamber 58. Cooling air is blown upon both faces of the film as it is drawn away from the knife blade by the take-off rolls 61 and 62 and the cooled dried material is delivered to the collecting trough 64 where the film is broken up and the smaller particles and flakes carried by the conveyer worm 65 to the bucket conveyer 66 which delivers the material to the collecting cans 67.

The cans 67 are carried directly into the adjacent, air conditioned packing room 79 where the material is suitably packaged and prepared for shipment.

It will be apparent that the invention can be variously modified and adapted within the scope of the appended claims.

I claim:

1. The combination in a mechanism for treating materials, of a rotating drying drum, means for delivering material to the surface of said drum to be dried thereon, a vapor collecting hood covering said surface, means for removing vapor therefrom, and a blower mechanism in said hood adjacent said drum so arranged as to direct vapor away from the partially dried material on said drum to said vapor removing means and in a direction counter to the direction of movement of said drum.

2. The combination in a mechanism for producing dry material in film form, of a heated drying surface, means for delivering material to said surface to be dried thereon, means for removing dried material from said surface in the form of a substantially continuous film, a zone of cooling air located immediately adjacent said removing means, means for causing said film to pass through said zone of cooling air immediately after removal from said drying surface, means for breaking up the film after cooling and means for collecting the broken film material.

3. The combination in a mechanism for treating materials, of a heated drying surface, means for delivering material to said surface to be dried thereon, means for removing dried material from said surface, a cooling zone located adjacent said removing means, means for conveying dried material through said zone, and means for directing a stream of cooling air across the path of said material.

4. The combination in a mechanism for producing dry material in film form, of a heated drying surface, means for delivering material to said surface to be dried thereon, means for removing dried material from said surface in the form of a substantially continuous film, a zone of cooling air located immediately adjacent said removing means, take-off rolls adapted to transfer said film from said removing means through said zone of cooling air, means for breaking up the film after cooling, and means for collecting said film.

5. The combination in a mechanism for producing dry material in film form, of a heated drying surface, means for delivering material to said surface to be dried thereon, means for removing dried material from said surface in the form of a substantially continuous film, a cooling zone located adjacent said removing means, take-off rolls arranged to transfer said film from said removing means through said cooling zone, means for directing a stream of cooling air across the path of said film, and means for collecting said film.

6. The combination in a mechanism for treating materials, of a drying surface, means for delivering material to said drying surface including a perforated material distributing tube extending across said surface, means for reciprocating said tube, and means in said tube for feeding said material along the interior of said tube.

7. The combination in a mechanism for treating materials, of a heated drying surface, means for delivering material to said surface to be dried thereon, means for removing the dry material from said surface, a cooling chamber adjacent said drying surface, means for causing said material to pass into said chamber upon removal from said surface, means for directing cooling air against said material in said chamber, a collector, and means in said chamber for delivering the cooled material to said collector.

8. The combination in a mechanism for producing dry material in film form, of a heated drying surface, means for delivering material to said surface to be dried thereon, means for removing dried material from said surface in the form of a substantially continuous film, an operating chamber adjacent said surface, means located in said chamber for drawing said film into said chamber immediately after removal from said drying surface, means for circulating a current of cooling air through said chamber to extract residual heat from said material, and means in said chamber for collecting the cooled material.

9. The combination in a mechanism for treating materials, of a heated drying surface and means cooperating therewith for producing dry material in the form of a substantially continuous film, an operating chamber immediately adjacent said surface, means for directing the dry film from said surface into said chamber upon removal from said surface, means for circulating a current of cooling air through said chamber to extract residual heat from said film, means for breaking up the film after cooling and means for collecting the cooled material.

10. The combination in a mechanism for treating materials, of a rotating heated drying drum, means for delivering material to said drum for drying thereon, means for removing dried material therefrom, a hood associated with said drum, an outlet above the drum for moisture laden air, a plurality of steeply inclined surfaces over said drum below the level of said outlet to prevent moisture condensed on the surfaces of said hood from dripping on to the surface of said drum, and means for collecting condensed moisture flowing down said inclined surfaces.

11. The combination in a mechanism for treating materials, of a rotating drying drum, means for delivering material to said drum for drying thereon including a feed tube, a perforated distributor tube for receiving material from said feed tube and depositing the material on said drum, means for controlling the rate at which material is deposited on said drum from said distributor tube, and means in said distributor tube for spreading the material along the length thereof.

12. The combination in a mechanism for treating materials, of a rotating drying drum, means for delivering material to said drum for drying thereon including a feed tube, a perforated distributor tube for receiving material from said feed tube and depositing the material on said drum, means for controlling the rate at which the material is deposited on said drum from said distributor tube, and means for reciprocating said distributor tube longitudinally to assist in depositing material evenly along said drying surface.

13. The combination in a mechanism for treating materials, a rotary drying drum, means for delivering pulp to said drum for drying thereon including a feed tube, a perforated distributor tube adapted to receive the pulp from said feed tube and deposit it on said drum, means for reciprocating said distributor tube, means for spreading the material along the inside of said tube, a scraper for removing dried material from said drum, means for passing the dry material through a cooling zone adjacent said drum immediately upon its removal from said drum, means for blowing a current of cooling air across the path of the dry material, means for collecting the cooled material, a hood enclosing said drum, means for passing a current of vapor collecting air through said hood in a direction counter to the direction of rotation of said drum, and an economizer for heating the incoming air by means of the heated vapor expelled from the material on said drum.

14. The combination in a mechanism for treating materials, of a heated drying surface, means for delivering material to said surface to be dried thereon, means for removing the dry material from said surface, a perforated surface operatively associated with said drying surface, means for passing the dry material over said perforated surface, and means for directing a current of cooling air through said perforated surface to extract residual heat from said material.

15. The combination in a mechanism for treating materials, of a heated drying surface, means for delivering material to said surface to be dried thereon, means for removing the dry material from said surface in the form of a substantially continuous film, a perforated surface operatively associated with said drying surface, means for passing the dry film over said perforated surface, and means for directing a current of cooling air through said perforated surface to extract residual heat from the material of said film.

WILLIAM W. COWGILL.